United States Patent [19]

Kitayama et al.

[11] Patent Number: 4,778,259

[45] Date of Patent: Oct. 18, 1988

[54] FERROELECTRIC LIQUID CRYSTAL DEVICES HAVING REVERSE TWIST ANGLE AND STABLE STATES RESULTING FROM A.C. EXCITATION

[75] Inventors: Hiroyuki Kitayama; Akira Tsuboyama, both of Tokyo; Yutaka Inaba, Kawaguchi; Kazuharu Katagiri, Tama; Kenji Shinjo, Yokohama, all of Japan

[73] Assignee: Canon Kabushiki Kaisha, Tokyo, Japan

[21] Appl. No.: 885,658

[22] Filed: Jul. 15, 1986

[30] Foreign Application Priority Data

Jul. 17, 1985 [JP] Japan ............................ 60-158669
Sep. 5, 1985 [JP] Japan ............................ 60-197444
Dec. 26, 1985 [JP] Japan ............................ 60-294456

[51] Int. Cl.$^4$ ........................................ G02F 1/13
[52] U.S. Cl. ............................ 350/350 S; 350/341
[58] Field of Search ....................... 350/341, 350 S

[56] References Cited

U.S. PATENT DOCUMENTS 4,563,059  1/1986  Clark et al. .................. 350/350 S X
4,586,791  5/1986  Isogai et al. ................. 350/350 S X
4,709,994 12/1987  Kanbe .............................. 350/350 S Primary Examiner—Stanley D. Miller
Assistant Examiner—Richard Gallivan
Attorney, Agent, or Firm—Fitzpatrick, Cella, Harper & Scinto

[57] ABSTRACT

A liquid crystal device includes a pair of substrates each having a uniaxial orientation as provided by rubbing or oblique vapor deposition, and a ferroelectric liquid crystal disposed between the substrates. The uniaxial orientation axes respectively provided to the pair of substrates intersect each other at an intersection angle $\theta$. The ferroelectric liquid crystal molecules may have such an alignment tendency that their axes are twisted along a normal to the substrates in the absence of an electric field when they are disposed between two substrates having the same direction of uniaxial orientation axes. The liquid crystal device may be subjected to an AC application pretreatment. The uniaxial orientation axes respectively provided to the base plates may have mutually different orientation controlling powers.

32 Claims, 3 Drawing Sheets

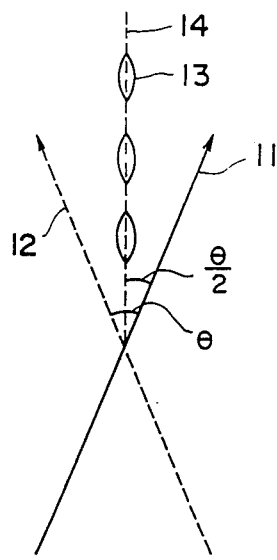
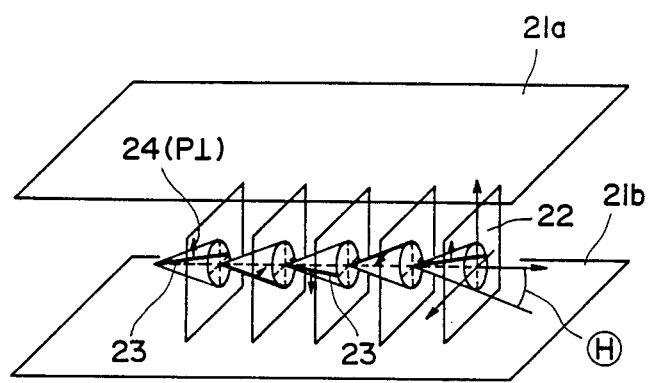
FIG. 1    FIG. 2
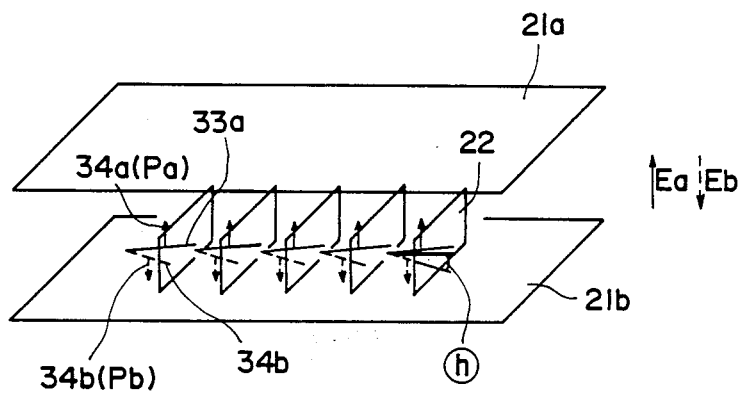
FIG. 3

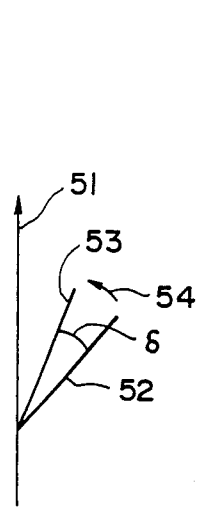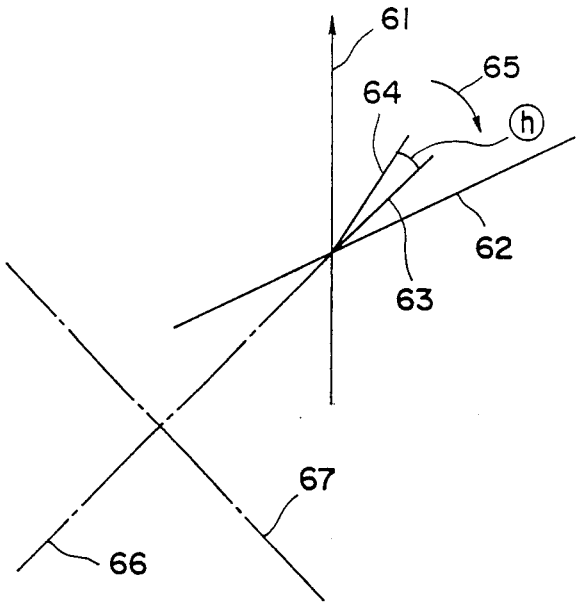
FIG. 5      FIG. 6
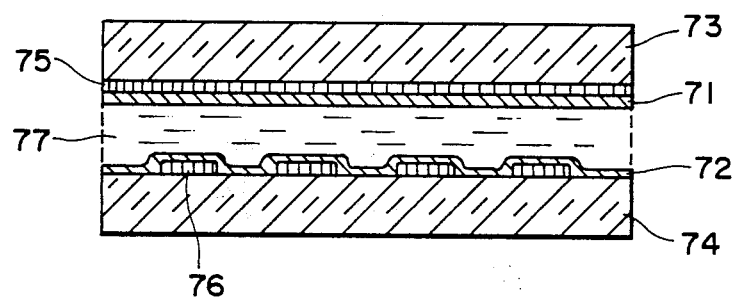
FIG. 7

FERROELECTRIC LIQUID CRYSTAL DEVICES HAVING REVERSE TWIST ANGLE AND STABLE STATES RESULTING FROM A.C. EXCITATION

BACKGROUND OF THE INVENTION

The present invention relates to a liquid crystal device for use in a liquid crystal display device or an optical shutter array, etc., and more particularly, to a liquid crystal device having improved display and driving characteristics, derived from improved initial alignment or orientation of liquid crystal molecules.

Hitherto, there has been known a liquid crystal device using a TN (twisted nematic) type liquid crystal, as shown in "Voltage-Dependent Optical Activity of a Twisted Nematic Liquid Crystal" by M. Schadt and W. Helfrich, Applied Physics Letters Vol. 18, No. 4 (Feb. 15, 1971), pp. 127–128. However, such a TN-liquid crystal device involves a problem of causing crosstalk when it is constructed with a high density of picture elements formed with a matrix electrode structure driven in a time-division manner, so that the number of picture elements has been restricted.

Further, there has been also known a display device of a system wherein picture elements are respectively provided with a thin film transistor (TFT) and are switched thereby one at a time. This system however involves a problem in that it requires a complicated step of forming TFTs on a substrate, so that it is difficult to form a display device of a large area.

In order to obviate the above-mentioned drawbacks of the conventional types of liquid crystal devices, Clark and Lagerwall have proposed the use of a liquid crystal device having bistability (Japanese Laid-Open patent application No. 107216/1981, U.S. Pat. No. 4,367,924, etc.). As the bistable liquid crystal, a ferroelectric liquid crystal having chiral smectic C (SmC*) phase or H (SmH*) phase is generally used. The ferroelectric liquid crystal has bistability, i.e., has two stable states comprising a first stable state and a second stable state, with respect to an electric field applied thereto. Accordingly, in contrast to the conventional TN-type liquid crystal in the above-mentioned device, the liquid crystal is oriented to the first stable state in response to one electric field vector and to the second stable state in response to the other electric field vector. Further, this type of liquid crystal very quickly assumes either one of the above-mentioned two stable states in reply to an electric field applied thereto and retains the state in the absence of an electric field. By utilizing these properties, essential improvements can be attained with respect to the above-mentioned difficulties involved in the conventional TN-type liquid crystal device.

However, in the ferroelectric liquid crystal devices provided heretofore, a uniform orientation or alignment state of a liquid crystal cannot satisfactorily be formed, whereby the optical modulation device cannot actually perform adequately. For this reason, several methods have been proposed to provide a uniform orientation state of a ferroelectric liquid crystal showing bistability in the presence of a surface which has been subjected to a rubbing treatment or an oblique vapor deposition treatment. It is already known that a uniform alignment state of a bistable ferroelectric liquid crystal can be obtained by using a substrate subjected to the above mentioned rubbing treatment or oblique vapor deposition treatment.

However, according to our experiment, we have found that the thus obtained bistable state is not ideal, while as disclosed by Clark and Lagerwall in the above-described publications.

More specifically, according to Clark and Lagerwall, the tilt angle (angle $h$ shown in FIG. 3 as will be explained hereinafter) in a chiral smectic phase of a nonspiral structure for realizing the bistability should be identical to a tilt angle (angle $H$ corresponding to one half of the apex angle of a cone shown in FIG. 2 explained hereinafter) in the corresponding chiral smectic phase having a spiral structure. In fact, however, the tilt angle $h$ in the nonspiral structure is smaller than the tilt angle $H$ in the spiral structure. Further, it has been found that the difference between the tilt angle $h$ in the nonspiral structure and the tilt angle $H$ in the spiral structure is attributable to a twisted arrangement of liquid crystal molecules in the nonspiral structure. More specifically, as shown in FIG. 5, in a chiral smectic phase of a nonspiral structure, the liquid crystal molecules are continuously twisted so as to form a twist angle $\delta$ from the axis 52 of the liquid crystal molecules contacting the upper substrate to the axis 53 of the liquid crystal molecules contacting the lower substrate along a twisted arrangement direction 54 with respect to a normal to the substrates. This arrangement causes a phenomenon that the tilt angle $h$ in the nonspiral structure is smaller than the tilt angle $H$ in the spiral structure. Line 51 denotes a uniaxial orientation axis provided by a rubbing treatment or an oblique vapor deposition treatment applied to the upper and lower substrates.

In the case of a liquid crystal device utilizing the birefringence of a liquid crystal, a transmittance with right angle cross nicols is expressed by the following equation:

$$I/I_0 = \sin^2 4h \cdot \sin^2(\Delta nd/\lambda)\pi,$$

wherein $I_0$ denotes an incident light intensity, $I$ a transmitted light intensity, $h$ a tilt angle, $\Delta n$ a refractive index anisotropy, $d$ the thickness of a liquid crystal layer, and $\lambda$ the wavelength of an incident light. The above-described tilt angle $h$ in the nonspiral structure appears as an angle between the average molecular axis directions of the liquid crystal molecules in the first and second orientation states respectively in a twisted arrangement. According to the above equation, the maximum transmittance is given when the tilt angle $h$ is 22.5°. However, the tilt angle $h$ in a nonspiral structure realizing bistability is of the order of 10°, so that the transmittance is of the order of 3–5% which is not sufficient for application to a display device.

Further, in the ferroelectric liquid crystal device provided heretofore, there is involved a problem that stabilization energy levels for a first orientation state and a second orientation state are not the same with each other under application of electric field vectors. More specifically, the magnitude of the electric field required for changing the first orientation state to the second orientation state is different from the magnitude of the electric field required for reversing the second orientation state to the first orientation state. Further, there is also observed a phenomenon (returning phenomenon) that a second orientation state produced by changing from a second orientation state under application of an electric field vector is lost without showing a proper memory effect to be returned to the original first orientation state when the electric field is removed.

These two phenomena may be attributed to a condition that the first stable orientation state and the second stable orientation state under bistability condition are not perfectly symmetrical to each other, but rather, one stable orientation state is more stable than the other stable orientation state. Such states are herein referred to as "unsymmetric two stable states". Such unsymmetric two stable states have caused a difference in thresholds when switching is effected between two stable orientation states to provide a problem in driving.

Further, there also results in mixing of another domain based on the first orientation state in a picture element where a uniform domain of the second orientation state is to be formed, thereby to cause lowering in light transmittance or poor light interrupting state.

SUMMARY OF THE INVENTION

An object of the present invention is to provide a liquid crystal device having resolved the above-mentioned problems or defects, particularly to provide a ferroelectric liquid crystal device realizing an excellent bistability state.

Another object of the present invention is to provide a liquid crystal device having an improved transmittance at the time of shutter opening through increase in tilt angle in a chiral smectic phase of a nonspiral structure realizing at least two stable states.

According to the present invention, there is provided a liquid crystal device, comprising: a pair of substrates each having a uniaxial orientation axis, and a ferroelectric liquid crystal disposed between the substrates; the uniaxial orientation axes respectively provided to the pair of substrates intersecting with each other at an intersection angle $\theta$.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a schematic plan view for illustrating a liquid crystal;

FIGS. 2 and 3 are schematic perspective views illustrating the basic operation principle of a liquid crystal cell used in the present invention;

FIG. 5 is a plan view schematically illustrating liquid crystal molecules arranged with a twist along a normal to the substrates;

FIG. 6 is a plan view showing a relationship between uniaxial orientation axes and liquid crystal molecular axes used in a liquid crystal device according to the present invention; and FIG. 7 is a schematic sectional view showing an embodiment of the liquid crystal device according to the present invention.

DETAILED DESCRIPTION OF THE PREFERRED EMBODIMENTS

Figure 4A:
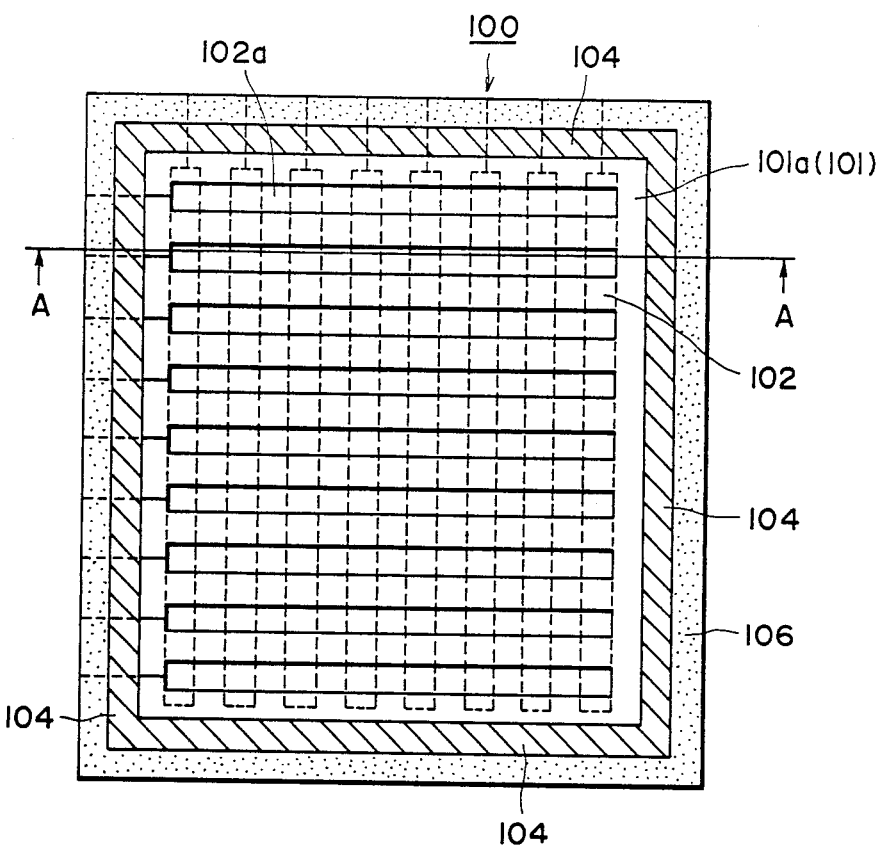
FIG. 4A is a plan view showing an embodiment of the liquid crystal optical device according to the present invention.

FIG. 1 is a plan view schematically illustrating a liquid crystal device according to the present invention. In the figure, a reference numeral 11 denotes the uniaxial orientation axis of an upper substrate, 12 the orientation axis of a lower substrate, $\theta$ an angle of intersection of the uniaxial orientation axes 11 and 12. Further, a reference numeral 13 denotes a molecule in a uniaxial anisotropic phase such as smectic A phase on a higher temperature side of a ferroelectric liquid crystal phase. The liquid crystals 13 are aligned along an axis 14 forming an angle $\theta/2$, one half of the intersection angle $\theta$.

Unexpectedly, when a liquid crystal compound is subjected to phase transition from isotripic phase through smectic A phase to chiral smectic C phase on gradual cooling between two substrates disposed to have uniaxial orientation axes crossing with an intersection angle $\theta$, it has been confirmed that the molecules are aligned along an axis 14 forming an angle of $\theta/2$ which corresponds to one half of the intersection angle $\theta$, i.e. a bisector of the intersection angle $\theta$. When smectic A phase in such an alignment state is gradually cooled to form chiral smectic C phase, the molecules in the chiral smectic C phase are oriented to either of the first orientation state and the second orientation state, as will be described hereinafter, with the axis 14 as the center and a tilt angle inherent to the liquid crystal material. The thus resultant bistable state including the first and second orientation states has been improved compared with the bistable state formed by using upper and lower substrates having uniaxial orientation axes parallel to each other, i.e., with no intersection angle.

In the present invention, the intersection angle $\theta$ is set to a range of 5°–85°, preferably 20°–70°. In a most preferred embodiment, the intersection angle $\theta$ may be set to a range of 30°–50°.

The results shown in FIG. 1 may be inserting with respect to a relationship between the uniaxial orientation axis directions and the actual orientation direction of liquid crystal molecules. The cause for these results, however, has not been clarified as yet.

Referring to FIG. 2, there is schematically shown an example of a ferroelectric liquid crystal cell for explanation of the operation thereof. Reference numerals 21a and 21b denote substrates a base plates (glass plates) on which a transparent electrode of, e.g., $In_2O_3$, $SnO_2$, ITO (Indium-Tin-Oxide), etc., is disposed, respectively. A liquid crystal of SmC* (chiral smectic C phase) in which liquid crystal molecular layers 22 are oriented perpendicular to surfaces of the glass plates is hermetically disposed therebetween. A full line 23 shows liquid crystal molecules. The liquid crystal molecules 23 continuously form a spiral or helical structure in the direction of extension of the base plates. An angle corresponding to one half of an apex angle of the cones thus formed is equal to a tilt angle (H) in the chiral smectic phase of a spiral structure. Each liquid crystal molecule 23 has a dipole moment (P⊥) 24 in a direction perpendicular to the axis thereof. When a voltage higher than a certain threshold level is applied between electrodes formed on the base plates 21a and 21b, a spiral structure of the liquid crystal molecule 13 is released or unwound to change the orientation direction of respective liquid crystal molecules 23 so that the dipole moments (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Particularly, in the present invention, an AC bias may be applied to this type of liquid crystal device in order to provide bistability. In this case, a liquid crystal having a negative dielectric anisotropy may be used.

Further, when a liquid crystal layer thickness is reduced to a sufficiently small thickness (e.g., about 1 micron), the spiral structure of the liquid crystal molecules is released to form a nonspiral structure even in the absence of an electric field, whereby the dipole moment assumes either of the two states, i.e., Pa in an upper direction 24a or Pb in a lower direction 24b as shown in FIG. 3. When an electric field Ea or Eb higher than a certain threshold level and different from each other in polarity as shown in FIG. 3 is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b. One half of the angle between the first and second orientation states at this time corresponds to the tilt angle (h).

When the above-mentioned ferroelectric liquid crystal is used as an optical modulation element, it is possible to obtain two advantages as briefly touched on hereinbefore. Firstly, the response speed is quite fast. Secondly, the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 23b, whereby the directions of molecules are changed. This state is similarly retained stably even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5–20 microns, particularly 1–5 microns. A liquid crystal-electrooptical device using this type of ferroelectric liquid crystal and a matrix electrode arrangement has been proposed, e.g., by Clark and Lagerwall in U.S. Pat. No. 4,367,924.

Examples of ferroelectric liquid crystals used in the present invention include decyloxybenzylidene-p'-amino-2-methylbutylcinnamate (DOBAMBC), hexyloxybenzylidene-p'-amino-2-chloropropylcinnamate (HOBACPC), p-decyloxybenzylidene-p'-amino-2-methylbutyl-α-cyanocinnamate (DOBAMBCC), p-tetradecyloxybenzylidene-p'-amino-2-methylbutyl-α-cyanocinnamate (TDOBAMBCC), p-octyloxybenzylidene-p'-amino-2-methylbutyl-α-chlorocinnamate (OOBAMBCC), p-octyloxybenzylidene-p'-amino-2-methybutyl-α-methylcinnamate, 4,4'-azoxycinnamic acid-bis(2-methylbutyl) ester, 4-o-(2-methyl)butylresorcylidene-4'-octylaniline, 4-(2'-methylbutyl)phenyl-4'-octyloxybiphenyl-4-carboxylate, 4-hexyloxyphenyl-4-(2''-methylbutyl)biphenyl-4'-carboxylate, 4-octyloxyphenyl-4-(2''-methylbiphenyl)-4'-carboxylate, 4-heptylphenyl-4-(4''-methylhexyl)biphenyl-4'-carboxylate, and 4-(2''-methylbutyl)phenyl-4-(4''-methylphexyl)-biphenyl-4'-carboxylate. These materials may be used singly or in combinations of two or more thereof. Further, another cholesteric liquid crystal or smectic liquid crystal may be mixed with these materials as far as the resultant mixture shows a ferroelectricity.

Further, in the present invention, the ferroelectic liquid crystal may be used in a chiral smectic phase, more specifically, chiral smectic C phase (SmC*), H phase (SmH*), I phase (SmI*), K phase (SmK*) or G phase (SmG*).

Figure 4B:
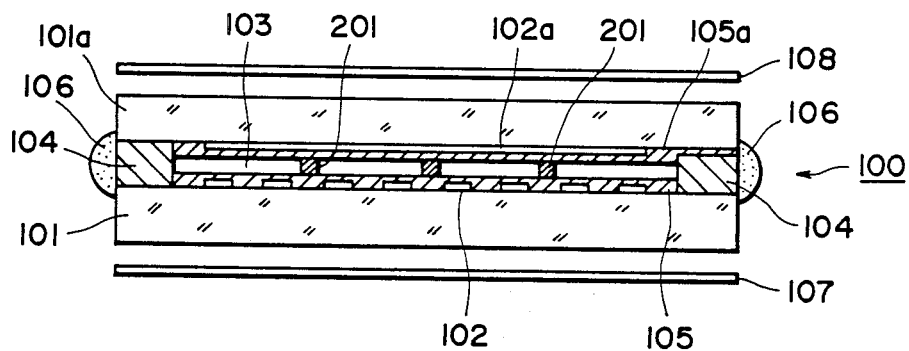
FIG. 4B is a sectional view taken along the line A—A in FIG. 4A.

FIGS. 4A and 4B illustrate an embodiment of the liquid crystal device according to the present invention. FIG. 4A is a plan view of the embodiment and FIG. 4B is a sectional view taken along the line A—A in FIG. 4A.

A cell structure 100 shown in FIG. 4 comprises a pair of substrates 101 and 101a made of glass plates or plastic plates which are held with a predetermined gap with spacers 104 and sealed with an adhesive 106 to form a cell structure. On the substrate 101 is further formed an electrode group (e.g., an electrode group for applying scanning voltages of a matrix electrode structure) comprising a plurality of transparent electrodes 102 in a predetermined pattern, e.g., of a stripe pattern. On the substrate 101 is formed another electrode group (e.g., an electrode group for applying signal voltages of the matrix electrode structure) comprising a plurality of transparent electrodes 102a intersecting with the transparent electrodes 102.

On the substrates 101 and 101a provided with such transparent electrodes 102 and 102a may be further formed orientation controlling films 105 and 105a, respectively, composed of an inorganic insulating material such as silicon monoxide, silicon dioxide, aluminum oxide, zirconia, magnesium fluoride, cerium oxide, cerium fluoride, silicon nitride, silicon carbide, and boron nitride, or an organic insulating material such as polyvinyl alcohol, polyimide, poly- amide-imide, polyesterimide, polyparaxylylene, polyester, polycarbonate, polyvinyl acetal, polyvinyl chloride, polyamide, polystyrene, cellulose resin, melamine resin, urea resin and acrylic resin.

The orientation controlling films 105 and 105a may be formed by first forming a film of an inorganic insulating material or an organic insulating material as described above and then rubbing the surface thereof in one direction with velvet, cloth, paper, etc.

In another preferred embodiment according to the present invention, the orientation controlling films 105 and 105a may be formed as a film of an inorganic insulating material such as SiO or $SiO_2$ on the substrates 101 and 101a by the oblique or tilt vapor deposition.

It is preferred that the orientation controlling films 105 and 105a also function as insulating films. For this purpose, the orientation controlling films may preferably have a thickness in the range of 100 Å to 1μ, especially 500 to 5000 Å. The insulating films also have a function of preventing the occurrence of an electric current which is generally caused due to minor quantities of impurities contained in the liquid crystal layer 103, whereby deterioration of the liquid crystal compounds is prevented even on repeating operations.

In the cell structure 100 shown in FIG. 4, the liquid crystal layer 103 may be formed into a chiral smectic phase such as SmC*, SmH*, SmF*, SmI* or SmG*.

The liquid crystal layer 103 may preferably be formed in SmC* through a phase transition on gradual cooling of isotropic phase→cholesteric phase→SmA?(smectic A phase)→SmC*, isotropic phase→SmA→SmC*, isotropic phase→cholesteric phase→SmC*, or isotropic phase→SmC*.

In the liquid crystal device according to the present invention, a plurality of spacer members 201 are disposed between a pair of substrates 101 and 101a. The spacer members 201 can be provided by forming a film of an inorganic compound such as SiO, $SiO_2$, $Al_2O_3$ and $TiO_2$, or a resin such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin and a photoresist resin on, e.g., the substrate 101a free of the orientation controlling film 105, and by etching the film to leave the spacer members 201 at appropriate parts.

In the present invention, it is also possible to use alumina particles, glass fiber, etc., as spacer members 201.

Such a cell structure 100 having substrates 101 and 101a is sandwiched between a pair of polarizers 107 and 108 to form an optical modulation device causing optical modulation when a voltage is applied between electrodes 102 and 102a.

Further, the liquid crystal device according to the present invention can be formed as one of a guest-host type by dissolving a dichroic colorant such an anthraquinone colorant, an azo colorant or a cyanine colorant. In this case, only one polarizer is required to provide a sufficiently large contrast between picture element shutter-opening and closing.

In another preferred embodiment of the present invention, molecules of a ferroelectric liquid crystal oriented to one stable state in a cell structure have an arrangement tendency of their molecular axes being successively twisted with respect to a normal to a pair of substrates sandwiching the ferroelectric liquid crystal in the absence of an electric field when the pair of substrates have the same direction of uniaxial orientation axes, but actually the ferroelectric liquid crystal is sandwiched between a pair of substrates having uniaxial orientation axes which are skewed or turned from one to the other with an angle (skew angle or intersection angle) in the direction reverse to that of the twisting of the liquid crystal molecules.

The angle and direction of twist of the liquid crystal molecules are determined by the kind of the liquid crystal used and the surface state of the substrates. When a pair of substrates having an intersection angle skewed in the direction reverse to the twist angle of arranged liquid crystal molecules are used, such a twist arrangement may be dissolved. According to a liquid crystal device wherein such a twisting arrangement is dissolved, a maximum optical contrast between the transmission state and the interrupting state can be obtained in combination with perpendicular cross nicols. Incidentally, in a liquid crystal device with a twist arrangement, a maximum contrast is attained with nonperpendicular cross nicols, but in this case, there is involved a view angle depending that the contrast changes depending on the direction of observing the cell. However, by using a liquid crystal device free of twist arrangement, such a view angle dependency can also be removed.

We have further discovered that when an AC electric field is preliminarily applied to the above mentioned liquid crystal device wherein the twist arrangement has been removed, the tilt angle $(h)$ in a chiral smectic phase of a nonspiral structure may be rendered almost equal to the tilt angle $(H)$ the spiral structure.

Accordingly, the liquid crystal device according to the present invention is characterized in that sufficient transmittance and contrast can be provided when it is applied to a liquid crystal apparatus, an optical shutter, etc.

FIG. 6 schematically illustrates an embodiment of the liquid crystal device according to the present invention. In the liquid crystal device, uniaxial orientation axes 61 and 62 are provided to the upper and lower substrates, respectively, so as to form an intersection angle skewed in a direction 65 which is reverse to the twist direction 54 shown in FIG. 5. When a chiral smectic liquid crystal material is cooled from a higher temperature phase than the chiral smectic phase in the presence of such uniaxially orientation treated surfaces, the liquid crystal is oriented so that the axes 63 of the liquid crystal molecules contacting the upper and lower substrates are parallel with each other. More specifically, on temperature decrease, the liquid crystal molecules in the smectic A phase (SmA) are aligned to form an axis 64 in a mid direction between the uniaxial orientation axes and then oriented to first and second stable states forming a tilt angle $(h)$ or $-(h)$ ($(h)$ in the first stable state and $-h$ in the second stable state) in the chiral smectic phase.

This liquid crystal device provides a maximum contrast when it is combined with a pair of polarizers arranged in perpendicular cross nicols in such a manner that the polarization axis 66 of one polarizer is parallel with the molecular axis 63 of the liquid crystal molecules contacting the upper and lower substrates and the polarization axis 67 of the other polarizer is perpendicular to the polarization axis 66.

In a preferred embodiment of the present invention, the above mentioned tilt angle $(h)$ maybe made equal to the same or substantially the same as the tilt angle $(H)$ in the spiral structure by applying an AC voltage in advance. The tilt angle $(h)$ at this time is denoted by $(h)'$. The AC voltage used at this time may be 20–500 volts, preferably 30–150 volts, at a frequency of 10–500 Hz, preferably 10–200 Hz. The AC voltage may be applied for several seconds to 10 minutes to effect the AC application pretreatment. The AC application retreatment may be applied in a stage before the liquid crystal device is subjected to writing based on image signals or information signals, preferably in a waiting period after the liquid crystal device is incorporated in an apparatus but before the operation of the apparatus, or alternatively during a period for producing the liquid crystal device.

The AC application pretreatment is based on our discovery through experiments that when an AC electric field is applied to a ferroelectric liquid crystal device placed in a bistability state, the tilt angle $(h)$ before the AC application is increased to $(h)'$ which is almost the same as the tilt angle $(H)$ in the spiral structure. Such an AC application pretreatment is effective for a ferroelectric liquid crystal having a large spontaneous polarization, e.g., 5 nC(nanoCoulomb)/$cm^2$ or above, preferably 10 nC/$cm^2$–300 nC/$cm^2$, at 25° C. The spontaneous polarization may be measured by the triangular wave application method (K. Miyasato et al., Japanese Journal of Applied Physics 22 (10), p.p. 661–663 (1983), "Direct Method with Triangular Waves for Measuring Spontaneous Polarization in Ferroelectric Liquid Crystal") by using a 100μ cell.

In another preferred embodiment of the present invention, the orientation controlling powers of the uniaxial orientation axes 61 and 62 applied to the ferroelectric liquid crystal molecules may be made different from each other. FIG. 7 is a sectional view showing an embodiment of the liquid crystal device of this type. In the liquid crystal device, a ferroelectric liquid crystal 77 having at least two stable states is disposed between a pair of upper and lower substrates 73 and 74. The orientation or alignment of the ferroelectric liquid crystal 77 is controlled by orientation controlling films 71 and 72 formed on the upper and lower substrates 73 and 74, respectively. The orientation controlling films 71 and 72 are disposed to cover transparent electrodes 75 and 76, respectively, formed in a matrix arrangement. In order to make different the orientation controlling powers of the two uniaxial orientation controlling films 61 and 62, different orientation controlling treatments may be applied to respective substrates. More specifically, the uniaxial orientation axis 61, for example, may be provided by rubbing a film of polyimide, polyvinyl alcohol, etc., and the other uniaxial orientation axis 62 may be provided by oblique vapor deposition of SiO, $SiO_2$, etc. In the present invention, a uniaxial orientation axis can also be provided by the oblique etching as an orientation controlling method.

As another may be providing different orientation controlling powers to the two uniaxial orientation axes 61 and 62, it is possible to adopt a method by which the orientation controlling films 71 and 72 may be formed from different films. More specifically, for example, the orientation controlling film 71 may be formed by rubbing a polyimide film to provide a uniaxial orientation axis 61, and the other orientation controlling film 72 may be formed by rubbing a polyvinyl alcohol film to provide a uniaxial orientation axis 62. The orientation controlling films 71 and 72 may be formed by another combination of two films of different materials different from the above described combination. Examples of materials forming the orientation controlling films 71 and 72 other than those described above include organic resins and such as polyamide-imide, polyesterimide, polyparaxylylene, polyester, polycarbonate, polyvinyl acetal, polyvinyl chloride, polyamide, polystyrene, cellulose resin, melamine resin, urea resin and acrylic resin, and inorganic materials such as SiO, $SiO_2$ and $TiO_2$, whereby the orientation controlling films 71 and 72 may be formed from different materials.

Another preferred method for providing different orientation controlling powers is one wherein the orientation controlling films 71 and 72 are once formed from the same material and by subjecting them to the same orientation controlling treatment, and then the treated surface of one of them is coated with an orientation suppressing film formed of a coupling agent such as a silane coupling agent, a titanium coupling agent, an aluminum coupling agent, an indium coupling agent or a zirconium coupling agent.

The silane coupling agent may be an organosilane compound, preferably one represented by the formula $R_nSiX_{4-n}$, wherein n is 1, 2 or 3; and X is, for example, a halogen atom such as chlorine atom or bromine atom; an alkoxy group such as methoxy, ethoxy, propoxy or butoxy, an acyloxy group such as acetoxy, or another hydrolyzable functional group. Further, R is a saturated aliphatic hydrocarbon group such as methyl, ethyl, propyl or butyl, an unsaturated aliphatic hydrocarbon group such as vinyl or an alkenyl, an aromatic hydrocarbon group such as phenyl or naphthyl, wherein a hydrogen atom in these carbon groups can be further replaced by an unsaturated group such as vinyl or an alkenyl, hydroxy group, carbonyl group, a halogen atom, amino group or another functional organic group.

Spceific compound examples are enumerated hereinbelow

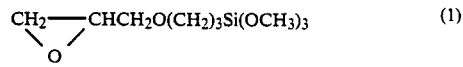  (1)

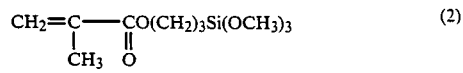  (2)

  (3)
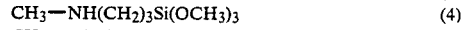  (4)
  (5)
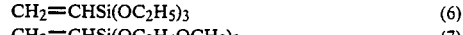  (6)
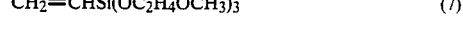  (7)

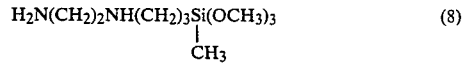  (8)

  (9)
  (10)
  (11)

The orientation suppressing film may be formed by applying a coating solution containing an organosilane compound onto an orientation controlling film to which a uniaxial orientation axis has been provided. In this case, the organosilane compound may preferably be contained in a proportion of 1–5 wt. % in the coating solution with a solvent, e.g., an alcohol solvent such as methanol, ethanol, isopropyl alcohol or butanol, or a ketone solvent such as acetone or methyl ethyl ketone.

The above-mentioned titanium coupling agent may be organotitanium compounds including, as preferred examples, those represented by the formula $Ti(OR)_4$, wherein OR denotes a hydroxy group, a carboxy group, or an alkoxy group. Specific examples thereof include tetraisopropoxytitanium, tetra-n-butoxytitanium, tetrabis(2-ethylhexoxy)titanium, tetrastearoxytitanium, diisopropoxy-bis(acetylacetonato)titanium, and di-n-butoxy-bis(triethanolaminato)titanium.

Further, the above-mentioned zirconium coupling agent, aluminum coupling agent and indium coupling agent may be organozirconium compounds, organoaluminum compounds and organoindium compounds, respectively, as described below. Thus, the organozirconium compounds may be those of the alkoxy type represented by the formula $Zr(OR)_4$ (OR being an alkoxy group) such as $Zr(i-OC_3H_7)_4$, $Zr(OC_4H_9)_4$, and $Zr(OC_9H_{19})_4$, and those of the chelate type such as $Zr(CH_3COCHCOCH_3)_4$. Further, the organoaluminum compounds may preferably be aluminum chelate compounds including those represented by the following formula:

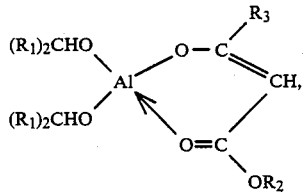

wherein $R_1$, $R_2$ and $R_3$ respectively denote an alkyl group such as methyl, ethyl, n-propyl, i-propyl, n-butyl, sec-butyl, n-amyl, n-hexyl, t-octyl, and n-nonyl. As a representative compound, acetoalkoxyaluminum diisopropylate may be raised. Further, the organoindium compounds may preferably be those represented by the formula $In(OR)_3$ (OR being hydroxy group, carboxy group, or an alkoxy group) including, as specific examples, $In(OC_2H_5)_3$, $In(OC_3H_7)_3$, $In(OC_5H_{11})_3$, $In(OC_8H_{17})$ and $In(OC_9H_{19})$.

When a ferroelectric liquid crystal is cooled from a higher temperature phase into a chiral smectic phase to be oriented in the presence of uniaxially orientation-treated surfaces provided with such uniaxial orientation axes 61 and 62 having orientation controlling powers different from each other, the axes 63 of the liquid crystal molecules contacting the upper and lower substrates are rendered parallel with each other. During the course of cooling, the liquid crystal molecules in the smectic A phase (SmA) aligned along an axis 64 in an intermediate direction between the uniaxial orientation axes 61 and 62, and in the chiral smectic phase, the liquid crystal molecules are oriented with a tilt angle ⓗ (or −ⓗ) from the axis 64 to form first and second stable states (the first state at the tilt ⓗ angle and the second stable states at the tilt angle −ⓗ).

This liquid crystal device provides a maximum contrast when it is combined with a pair of polarizers arranged in perpendicular cross nicols in such a manner that the polarization axis 66 of one polarizer is parallel with the molecular axis 63 of the liquid crystal molecules contacting the upper and lower substrates and the polarization axis 67 of the other polarizer is perpendicular to the polarization axis 66.

In a preferred embodiment of the present invention, the above-mentioned AC application pretreatment may be effected.

Hereinbelow, the present invention will be explained based on specific examples.

EXAMPLE 1

A liquid crystal device 100 as shown in FIGS. 4A and 4B was prepared.

On a pair of glass substrates 101 and 101a were formed patterned electrodes 102 and 102a, respectively, in the form of stripes. Then, orientation controlling films 105 and 105a of polyimide were formed by spinning and curing. Then, the substrate surfaces were subjected to rubbing in the rubbing directions as will be described hereinafter. The substrates were then secured to each other so that their stripe electrodes crossed each other to form a cell. Then, DOBAMBC as a ferroelectric liquid crystal having a chiral smectic phase was injected into the cell to provide a liquid crystal layer 103. The liquid crystal layer 103 of the cell was heated into isotropic phase, and gradually cooled at a rate of 0.5° C/hr. for orientation.

On both sides of the substrates 101 and 101a of the liquid crystal device thus prepared were disposed polarizers 107 and 108, respectively, and voltages were applied between the electrodes 102 and 102a to cause optical modulation, whereby switching characteristics were observed under these conditions.

In this example, the rubbing axis directions of the upper and lower substrates were arranged to intersect each other at an intersection angle $\theta$ of 30° (the intersection angle was defined as an angle of the rubbing direction of the lower substrate measured from the rubbing direction of the upper substrate). For comparison, a liquid crystal device was prepared in the same manner as described above except that the rubbing directions of the upper and lower substrates were parallel with each other (intersection angle $\theta = 0°$). The thus prepared two liquid crystal devices were subjected to switching between two stable states at 70° C. by applying voltage pulses with a duration of 1 msec.

As a result, the liquid crystal device of $\theta = 0°$ showed "unsymmetric stable states" wherein the threshold voltage for switching from the stabler orientation state to the unstabler orientation state was 30.2 V while the threshold voltage for switching from the unstabler orientation state to the stabler orientation state was 21.8 V. Further, when the switching was effected from the stabler orientation state to the unstabler orientation state, a "returning" phenomenon of the resultant unstabler orientation state being returned to the stabler orientation state was observed 1-2 seconds after the switching.

On the other hand, for the liquid crystal device of $\theta = 30°$, the threshold voltage for switching between the two stable orientation states was 20.5 V regardless of the directions of the switching and a "returning" phenomenon as observed in the case of $\theta = 0°$ was not observed.

As understood from the above results, a ferroelectric liquid crystal device showing an improved bistability can be obtained by arranging two rubbing treatment axes provided to upper and lower substrates so as to form a certain intersection angle.

EXAMPLES 2-4

In these examples, liquid crystal devices were prepared in the same manner as in Example 1 except that a chiral smectic liquid crystal having the following composition and different intersection angle $\theta$ between rubbing axes provided to upper and lower substrates were used.

| Liquid Crystal Composition | wt. ratio |
|---|---|
| $C_8H_{17}O-\bigcirc-COO-\bigcirc-OCH_2\overset{*}{C}H-C_2H_5$ <br> $\qquad\qquad\qquad\qquad\qquad\qquad\quad \vert$ <br> $\qquad\qquad\qquad\qquad\qquad\qquad\ CH_3$ | 2 |
| $C_8H_{17}O-\bigcirc-OCO-\bigcirc-\bigcirc-CH_2\overset{*}{C}H-C_2H_5$ <br> $\qquad\qquad\qquad\qquad\qquad\qquad\qquad\ \vert$ <br> $\qquad\qquad\qquad\qquad\qquad\qquad\quad\ CH_3$ | 1 |
| $C_8H_{17}O-\bigcirc-N=N-\bigcirc-OCO-\overset{*}{C}HOC_7H_{15}$ <br> $\qquad\qquad\qquad\qquad\qquad\qquad\qquad\quad \vert$ <br> $\qquad\qquad\qquad\qquad\qquad\qquad\qquad\ CH_4$ | 0.3 |

The mixture liquid crystal showed SmC* phase in the temperature range of 3°-35° C.

Respective liquid crystal devices were prepared to have θ=0° (Comparative Example), θ=30° (Example 2), θ=45° (Example 3) and θ=90° (Example 4). The results obtained in the same manner except for a measurement temperature of 28° C. are summarized in the following Table 1.

TABLE 1

|  |  | Comparative Example | Example 2 | Example 3 | Example 4 |
|---|---|---|---|---|---|
| θ |  | 0° | 30° | 45° | 90° |
| Threshold | State A → State B | 20.3 V | 20.8 V | 20.1 V | 26.3 V |
| voltage | State B → State A | 23.5 V | 21.5 V | 22.4 V | 30.6 V |
| Returning phenomenon |  | Observed | None | None | Observed |

In Table 1, State A means an unstabler orientation state (having a higher threshold voltage) and State B means a stabler orientation state (having a lower threshold voltage).

The above results show that a good bistability is attained when the rubbing directions are arranged to form a certain angle, preferably 30°–50°.

EXAMPLE 5

A liquid crystal device was prepared in the same manner as in Example 1 except that the polyimide orientation films were replaced by $SiO_2$ films obtained by oblique vapor deposition in the following manner.

A glass substrate provided with ITO pattern electrodes as used in Example 1 was placed in an oblique vapor deposition apparatus wherein a crystal of $SiO_2$ was placed in a crucible. Then, the vapor deposition apparatus was evacuated to a vacuum of the order of $10^{-5}$ Torr, and $SiO_2$ was obliquely vapor-deposited in a prescribed manner to form an 800 Å-thick oblique vapor deposition film.

A pair of the thus prepared substrates were secured to each other to provide a prescribed intersection angle between the uniaxial orientation axes, and thereafter the procedure of Example 1 was followed by using DOBAMBC to provide a liquid crystal device of θ=0° (Comparative Example) and a liquid crystal device of θ=30° (Example). The thus prepared two devices were subjected to measurement of switching characteristics at 70° C. in the same manner as in Example 1.

As a result, the liquid crystal device of θ=0° showed that the threshold voltage for switching from the stabler orientation state to the unstabler orientation state was 28.5 V while the threshold voltage for switching from the unstabler orientation state to the stabler orientation state was 23.0 V. Further, when the switching was effected from the stabler orientation state to the unstabler orientation state, a "returning" phenomenon was also observed.

On the other hand, for the liquid crytsal device of θ=30°, the threshold voltage for switching between the two stable orientation states was 23.5 V regardless of the directions of the switching and a "returning" phenomenon was not observed either.

The results of Examples 1–5 show that a better bistability can be realized by using upper and lower substrates arrange to have uniaxial orientation axes intersecting with each other regardless of whether the method for orientation treatment is rubbing on $SiO_2$ oblique vapor deposition.

EXAMPLE 6

A test was carried out in order to know a twisting arrangement direction about a normal to substrates by using a liquid crystal device. The liquid crystal device having a 3 μ-thick liquid crystal layer was prepared by using a ferroelectric mixture liquid crystal having the following composition and showing SmC* in the temperature range of 3°–35° C.

| Mixture Liquid Crystal | wt. ratio |
|---|---|
| $C_8H_{17}O$—⌬—COO—⌬—$OCH_2\overset{*}{C}H$—$C_2H_5$ <br>                                                                     $CH_3$ | 2 |
| $C_8H_{17}O$—⌬—OCO—⌬—⌬—$CH_2\overset{*}{C}H$—$C_2H_5$ <br>                                                                       $CH_3$ | 1 |
| $C_8H_{17}$—⌬—N=N—⌬—OCO—$\overset{*}{C}HOC_7H_{15}$ <br>                                                                           $CH_3$ | 0.3 |

The 3 μ-thick cell was prepared from a pair of 0.7 mm-thick glass plates each provided with ITO (Indium-Tin-Oxide) pattern electrodes and a 1000 Å-thick PVA (polyvinyl alcohol) film to which was provided a uniaxial orientation axis by rubbing. The cell was prepared by securing the glass substrates to each other so that their rubbing directions were parallel with each other, with 3 μ-bead spacers disposed therebetween to provide the above mentioned cell thickness (more accurately, the spacing between the substrates).

The above mentioned mixture liquid crystal in isotropic phase was injected into the thus prepared cell under vacuum and gradually cooled at a rate of 0.5° C./hr down to 30° C. to be oriented. The experiments thereafter were carried out at 30° C.

When this cell was observed in combination with cross nicols, a uniform monodomain free of defects was found to be observed. The liquid crystal was in SmC* phase and found to form bistable states of blue and yellow while the contrast was very low.

A pulse electric field was applied to the liquid crystal device so as to uniformly orient the liquid crystal molecules to one stable state, and the liquid crystal device was rotated between cross nicols to know a position where the minimum quantity of transmitted light was attained. The darkest state was in not black but blue, while it was expected that a black color should be obtained if the liquid crystal molecules were in parallel with the substrates and aligned in one direction.

We further continued experiments with an idea that the (blue) coloring was caused by a twisting arrangement of liquid crystal molecules with respect to a normal to the base plates.

Such a twisting arrangement could be detected by changing the angle between a polarizer on the light source side and an analyzer on the viewer side and by observing whether or not a darker state was attained.

The twisting direction and also the skew angle of the uniaxial orientation axes mentioned hereinafter was referred to as "positive" where it was clockwise when viewed from the viewer side and as "negative" when it was anti-clockwise. When the analyzer was rotated by 10°–13° in the negative direction from the perpendicular cross nicols and then by rotating the liquid crystal cell, a dark state was attained. Further, the dark state was similarly attained by rotating the polarizer by 10°–13° in the positive direction. As a result, it was found that the liquid crystal molecules in the device was arranged to form a twist in the positive direction and the longer axes of the liquid crystal molecules contacting the upper and lower substrates were twisted with a twist angle δ of 10°–13°.

Then, 5 liquid crystal devices were prepared in the same manner as described above except that the spacing between the upper and lower substrates was reduced to 1.8 μm and the rubbing axes were arranged to intersect with each other. The spacing was reduced to 1.8 μm because it had been empirically known as advantageous in providing a contrast and a bistability compared with 3 μm. The five liquid crystal devices were prepared by setting the intersection or skew angle between the uniaxial orientation axes provided by rubbing to the upper and lower substrates to (+)45°, (+)20°, (−)45°, (−)20°, and 0° (parallel).

The tilt angles (h) of the respective liquid crystal devices described above were measured to be 7°–9° in any cases. The liquid crystal in these liquid crystal devices showed SmA on a higher temperature side than SmC* and the optical axis of the SmA was found to align on the bisector of the angle between the intersecting rubbing axes.

Then, a high electric field AC of 70 volts and 70 Hz was respectively applied to the above mentioned 5 liquid crystal devices for about 5 minutes (AC application pretreatment). The tilt angles (h)' at this time was measured and are shown in the following Table 2.

TABLE 2

| Intersection angle between rubbing axes | −45° | −20° | 0° (parallel) | +20° | +45° |
|---|---|---|---|---|---|
| Tilt angle h ' | 19° | 21° | 19° | 20° | 21° |

The twist angles δ were measured with respect to the 5 liquid crystal devices in the same manner as in the above mentioned measurement of the twist angle δ with respect to the 3 μm-cell, whereby no twist angle δ of liquid crystal molecules about a normal to the substrates was observed with respect to the liquid crystal devices using intersecting rubbing axes at intersection angles −45° and −20° so that the liquid crystal molecular axes contacting the upper and lower substrates were found to be parallel with each other. Furthermore, with respect to the liquid crystal devices having the intersection angles of −45° and −20°, the tilt angles (h)' shown in Table 2 were retained even after continuous application of alternating rectangular pulses for driving of +19 volts and −19 volts and a duration of 1 msec. This means that the maximum tilt angles (h)' can be retained when time-division driving methods as disclosed in Japanese Laid-Open Patent Applications Nos. 193426/1984 and 19347/1984 are applied to these devices. The transmittances at this time were measured to be about 17% in both cases.

On the other hand, the twist angles δ of the liquid crystal devices having rubbing axis intersection angles of 0°, +20° and +45° were measured to be 10°–13° in any cases before the above mentioned AC application pretreatment. Then, after the AC application pretreatment, the twist angles δ were again measured, whereby they were found to be removed to provide the liquid crystal molecules oriented with the above mentioned tilt angles (h)' shown in Table 2. However, when these liquid crystal devices were subjected to repetitive switching between the two stable states by application of rectangular driving pulses as described above, the tilt angles were gradually reduced from the maximum tilt angles (h)' to be finally attenuated to the small tilt angles (h) before the AC application pretreatment. The transmittances of liquid crystal devices at this time were measured to be 3–4% in any cases.

Detailed mechanisms for the above phenomena have not been clarified but may be assumed as follows.

A twist arrangement having a twist angle δ is determined by interaction between substrates and liquid crystal molecules in the vicinity of the surfaces of the substrates. More specifically, whether the polarization direction of liquid crystal molecules near a substrate surface is inward or outward with respect to the substrate surface, is determined by the property of the substrate, so that when liquid crystal molecules are disposed between upper and lower substrates having the same orientation controlling film, the liquid crystal molecules are forced to be aligned or oriented in a twist arrangement.

In a case where the twist arrangement direction and the skew direction of uniaxial orientation axes provided to the substrates are the same with respect to a normal to the substrates, the liquid crystal molecules near the substrate surfaces are forced to align toward the direction of the orientation axes of the substrates, the twist arrangement is further stabilized, so that the above mentioned tilt angle (h)' after the AC application pretreatment is provided as a mere metastable orientation state.

In the state providing a tilt angle (h)' after the AC application pretreatment, the polarization of liquid crystal molecules near substrate surfaces is required to be inwardly directed on one substrate surface and outwardly directed on the other substrate surface.

Where the uniaxial orientation axes are skewed in a direction opposite to the twist direction of a liquid crystal, in other words, where the uniaxial orientation axes are arranged to intersect with each other at an angle in a direction reverse to the twist direction, a state of providing a stable tilt angle (h)' is realized because the stabilization energy due to forcive anchoring effect provided by a uniaxial orientation axis is larger than the stabilization energy due to interaction between a molecular polarization and a substrate surface.

Accordingly, in order to provide a ferroelectric liquid crystal device having a high transmittance, it is necessary to dissolve the twist arrangement and skew the uniaxial orientation axes in a direction to stabilize an ideal alignment state provided by the AC application pretreatment. The desired direction is one reverse to a twist arrangement direction of a twist angle δ determined by the interaction between the liquid crystal and the substrate surfaces.

EXAMPLE 7

Liquid crystal devices were prepared in the same manner as used for producing the 1.8 μm-cell in Example 6 except that the PVA films were replaced by polyimide films which were prepared by applying a polyamide acid solution (a dehydrocondensation product of pyromellitic dianhydride and 4,4-diaminodiphenyl ether) followed by a dehydro-ring closure reaction on heating. The liquid crystal devices were prepared to have rubbing axis intersection angles of 0°, −20° and −45°, respectively.

The twist angle δ and twist direction of the liquid crystal device having a rubbing axis intersection angle of 0° were measured to be 9°-11° and a positive direction.

Then, an AC application pretreatment of 120 volts and 50 Hz was respectively applied to the liquid crystal devices having intersection angles −20° and −45°. In these liquid crystal devices, the twist arrangement of the liquid crystal molecules was removed. The tilt angles (h)' and transmittances measured with respect to the liquid crystal devices after the AC application pretreatment are summarized in the following Table 3.

TABLE 3

| Intersection angle | −20° | −45° |
|---|---|---|
| Tilt angle (h)' | 21° | 18° |
| Transmittance | 16% | 20% |

Then, driving rectangular pulses of +20 volts and −21 volts and a duration of 1 msec were applied to cause repetitive switching between the bistable states, whereby no change in tilt angle or transmittance was observed during the operation.

EXAMPLE 8

Liquid crystal devices were prepared in the same manner as used for producing the 1.8 μm-cell in Example 6 except that DOMAMBC was used in place of the mixture liquid crystal. The liquid crystal devices were prepared to have rubbing axis intersection angles of 0°, −20° and 45°, respectively.

The twist angle δ and twist direction of the liquid crystal device having a rubbing axis intersection angle of 0° were measured to be 13°-14° and a positive direction.

Then, an AC application pretreatment of 80 volts and 50 Hz was respectively applied to the liquid crystal devices having intersection angles −20° and −45°. In these liquid crystal devices, the twist arrangement of the liquid crystal molecules was removed. The tilt angles (h)' and transmittances measured with respect to the liquid crystal devices after the AC application pretreatment are summarized in the following Table 4.

TABLE 4

| Intersection angle | −20° | −45° |
|---|---|---|
| Tilt angle (h)' | 17° | 16° |
| Transmittance | 16% | 16% |

Then, driving rectangular pulses of +25 volts and −25 volts and a duration of 1 msec were applied to cause repetitive switching between the bistable states, whereby no change in tilt angle or transmittance was observed during the operation.

According to the bistable ferroelectric liquid crystal device of the present invention, molecular axes of a ferroelectric liquid crystal adjacent to upper and lower substrates are rendered parallel with each other, whereby a maximum contrast may be obtained by using perpendicular cross nicols, while nonperpendicular cross nicols have been used to provide a maximum contrast in a bistable ferroelectric liquid crystal device having a twist arrangement. Thus, a view angle depending caused thereby has been removed. Further, according to the present invention, by applying an AC application pretreatment to the above mentioned bistable ferroelectric liquid crystal device having removed the twist arrangement, a tilt angle in a chiral smectic phase of a nonspiral structure can be increased, whereby a sufficient transmittance for application to a display apparatus or an optical switching device can be obtained.

EXAMPLE 9

Liquid crystal devices were prepared in the same manner as used for producing the 1.8 μm-cell in Example 6 except that the PVA film on one substrate was replaced by polyimide film which was prepared by applying 5 wt.% solution in N-pyrrolidone of a polyamide acid (a dehydrocondensation product of pyromelitic dianhydride and 4,4-diaminodiphenyl ether) followed by a dehydro-ring closure reaction on heating. The liquid crystal devices were prepared to have rubbing axis intersection angles of +45°, +20°, 0°, −20° and −45°, respectively.

The tilt angles (h) of the thus prepared five 1.8 μm-cells were measured to obtain the values shown in the following Table 5.

TABLE 5

| Intersection angle | −45° | −20° | 0° (parallel) | +20° | +45° |
|---|---|---|---|---|---|
| Tilt angle (h) | 18° | 16° | 8° | 8° | 8° |

The liquid crystal in these liquid crystal devices showed SmA on a higher temperature side than SmC* and the optical axis of the SmA was found to align on the bisector of the angle between the intersecting rubbing axes.

The twist angles δ were measured with respect to the 5 liquid crystal devices in the same manner as in Example 6, whereby no twist angle δ of liquid crystal molecules about a normal to the substrates was observed with respect to the liquid crystal devices using intersecting rubbing axes at intersection angles −45° and −20° so that the liquid crystal molecular axes contacting the upper and lower substrates were found to be parallel with each other. Furthermore, with respect to the liquid crystal devices having the intersection angles of −45° and −20°, the tilt angles (h) shown in Table 5 were retained even after continuous application of alternating rectangular pulses for driving of +19 volts and −19 volts and a duration of 1 msec. This means that the maximum tilt angles (h) can be retained when time-division driving methods as disclosed in Japanese Laid-Open Patent Applications 193426/1984 and 19347/1984 are applied to these devices. The transmittances at this time were measured to be about 15% in both cases.

On the other hand, the twist angles δ of the liquid crystal devices having rubbing axis intersection angles of 0°, +20° and +45° were measured to be 10°-13° in any cases. The transmittances of the liquid crytal devices at this time were measured to be 2-3% in any cases.

Then, a high electric field AC of 70 volts and 70 Hz was respectively applied to the above mentioned 5 liquid crystal devices for about 5 minutes (AC application pretreatment). The title angles (h)' at this time was measured and are shown in the following Table 6.

TABLE 6

| Intersection angle | −45° | −20° | 0° (parallel) | +20° | +45° |
|---|---|---|---|---|---|
| Tilt angle ⓗ' | 21° | 19° | 18° | 18° | 18° |

The twist angle δ were measured with respect to the 5 liquid crystal devices, whereby no twist angle δ of liquid crystal molecules about a normal to the substrates was observed with respect to the liquid crystal devices using intersecting rubbing axes at intersection angles −45° and −20° so that the liquid crystal molecular axes contacting the upper and lower substrates were found to be parallel with each other. Furthermore, with respect to the liquid crystal devices having the intersection angles of −45° and −20°, the tilt angles ⓗ' shown in Table 2 were retained even after continuous application of alternating rectangular pulses for driving of +19 volts and −19 volts and a duration of 1 msec. The transmittances at this time were measured to be about 18% in both cases.

On the other hand, the twist angles δ of the liquid crystal devices having rubbing axis intersection angles of 0°, +20° and +45° were measured after the AC application pretreatment, whereby they were found to be removed to provide the liquid crystal molecules oriented with the above mentioned tilt angles ⓗ' shown in Table 6. However, when these liquid crystal devices were subjected to repetitive switching between the two stable states by application of rectangular driving pulses as described above, the tilt angles were gradually reduced from the maximum tilt angles ⓗ' to be finally attenuated to the small tilt angles ⓗ before the AC application pretreatment. The transmittances of liquid crystal devices at this time were measured to be 2–3% in any cases.

EXAMPLE 10

Liquid crystal devices were prepared in the same manner as in preparation of the 3 μm-thick cell in Example 6 except that the spacing between the substrates was changed to 1.8 μm, intersecting rubbing axes were used, and one PVA film was coated with a film of a silane coupling agent H₂N(CH₂)₂—NH(CH₂)₃ Si-(OCH₃)₃ as an orientation suppressing film. The orientation suppressing film was formed by applying a coating solution obtained by dissolving 1 g of the above mentioned silane coupling agent in 100 ml of ethanol with a spinner coater under the conditions of 2000 rpm and 30 minutes. The liquid crystal devices were prepared to have rubbing axis intersection angles of 0°, −20° and −45°.

The twist angle δ and twist direction of the 1.8 μ-thick liquid crystal devices having a rubbing axis intersection angle of 0° were measured to be 11°–12° and a positive direction.

Then, in the liquid crystal devices having intersection angles −20° and −45°, the twist arrangement of the liquid crystal molecules was removed. The tilt angles ⓗ and transmittances measured with respect to the liquid crystal devices after the AC application pretreatment are summarized in the following Table 7.

TABLE 7

| Intersection angle | −20° | −45° | 0° |
|---|---|---|---|
| Tilt angle ⓗ | 18° | 16° | 9° |
| Transmittance | 15% | 14% | 3% |

Then, driving rectangular pulses of +21 volts and −21 volts and a duration of 1 msec were applied to cause repetitive switching between the bistable states, whereby no change in tilt angle or transmittance was observed during the operation.

EXAMPLE 11

Liquid crystal devices were prepared in the same manner as in preparation of the 3 μm-thick cell in Example 6 except that the spacing between the substrates was changed to 1.8 μm, one uniaxial orientation axis was provided by oblique vapor deposition of SiO₂, and the resultant two uniaxial orientation axes were arranged to intersect with each other. The liquid crystal devices were prepared to have rubbing axis intersection angles of 0°, −20° and −45°.

The twist angle δ and twist direction of the 1.8 μm-thick liquid crystal devices having a rubbing axis intersection angle of 0° were measured to be 13°–14° and a positive direction.

Then, in the liquid crystal devices having intersection angles −20° and −45°, the twist arrangement of the liquid crystal molecules was removed. The tilt angles ⓗ and transmittances measured with respect to the liquid crystal devices after the AC application pretreatment are summarized in the following Table 8.

TABLE 8

| Intersection angle | −20° | −45° | 0° |
|---|---|---|---|
| Tilt angle ⓗ | 14° | 13° | 6° |
| Transmittance | 12% | 11% | 2–3% |

Then, driving rectangular pulses of +21 volts and −21 volts and a duration of 1 msec were applied to cause repetitive switching between the bistable states, whereby no change in tilt angle or transmittance was observed during the operation.

According to the bistable ferroelectric liquid crystal of the present invention, molecular axes of a ferroelectric liquid crystal adjacent to the upper and lower substrates are rendered parallel with each other, whereby a maximum contrast may be obtained by using perpendicular cross nicols, while nonperpendicular cross nicols have been used to provide a maximum contrast in a bistable ferroelectric liquid crystal device having a twist arrangement. Thus, a view angle dependency caused thereby has been removed. Furthermore, the tilt angle ⓗ may be increased, so that an improved contrast can be attained.

What is claimed is:

1. A liquid crystal apparatus, comprising:
   (a) a liquid crystal cell having a pair of substrates each having a uniaxial orientation axis and a ferroelectric liquid crystal disposed between the substrates, the uniaxial orientation axes respectively provided to said pair of substrates intersecting with each other at an intersection angle θ so as to provide a first bistable state of the ferroelectric liquid crystal including two stable molecular orientations which form an angle twice a first tilt angle ⓗ in the absence of an electric field;
   (b) means for applying an AC voltage to provide a second bistable state of the ferroelectric liquid crystal including two stable molecular orientations which form an angle twice a second tilt angle ⓗ', the second tilt angle ⓗ' being larger than the first tilt angle ⓗ; and (c) means for applying a voltage pulse of one or the other polarity so as to re-orient the molecular orientation of the ferroelectric liquid crystal to the other molecular orientation of the ferroelectric liquid crystal placed under the second bistable state caused by the AC voltage application.

2. A liquid crystal apparatus according to claim 1, wherein said ferroelectric liquid crystal provides a uniaxially anisotropic phase on a higher temperature side, the liquid crystal molecules in the uniaxially anisotropic phase being aligned in the direction of the bisector of the intersection angle $\theta$.

3. A liquid crystal apparatus according to claim 2, wherein said uniaxially anisotropic phase is smectic A phase.

4. A liquid crystal apparatus according to claim 1, wherein the intersection angle $\theta$ is in the range of 5°–85°.

5. A liquid crystal apparatus according to claim 1 wherein the intersection angle $\theta$ is in the range of 20°–70°.

6. A liquid crystal apparatus according to claim 1, wherein the intersection angle $\theta$ is in the range of 30°–50°.

7. A liquid crystal apparatus according to claim 1, wherein said ferroelectric liquid crystal is a chiral smectic liquid crystal.

8. A liquid crystal apparatus according to claim 1, wherein said uniaxial orientation axis has been provided by rubbing.

9. A liquid crystal apparatus according to claim 1, wherein said uniaxial orientation axis has been provided to an orientation controlling film formed on the substrates.

10. A liquid crystal apparatus according to claim 9, wherein said orientation controlling film comprises an insulating organic resin film.

11. A liquid crystal apparatus according to claim 9, wherein said orientation controlling film comprises an inorganic insulating film.

12. A liquid crystal apparatus according to claim 1, wherein said AC voltage is 20–500 volts at a frequency of 10–500 Hz.

13. A liquid crystal device comprising: a cell structure including a pair of substrates each having a uniaxial orientation surface, and a ferroelectric liquid crystal disposed between the substrates placed under bistability condition; the molecules of the ferroelectric liquid crystal in the cell structure having such an alignment tendency that the molecular axes are twisted along a normal to the substrates in the absence of an electric field when disposed between two substrates having the same direction of uniaxial orientation axes; the uniaxial orientation surfaces of said pair of base plates having uniaxial orientation axes intersecting with each other at an angle skewed in a direction reverse to the twist direction of the liquid crystal molecules.

14. A liquid crystal device according to claim 13, wherein said uniaxial orientation axis has been provided by rubbing.

15. A liquid crystal device according to claim 13, wherein said uniaxial orientation axis having been provided by oblique vapor deposition.

16. A liquid crystal device according to claim 13, wherein said uniaxial orientation surface is formed of an organic resin.

17. A liquid crystal device according to claim 16, wherein said organic resin comprises at least one resin selected from the group consisting of polyvinylalcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin and acrylic resin.

18. A liquid crystal device according to claim 13, wherein said ferroelectric liquid crystal has been subjected to an AC application treatment.

19. A liquid crystal device according to claim 18, wherein said AC application treatment is carried out by using an AC electric field of a voltage of 25–500 volts and a frequency of 10–500 Hz.

20. A liquid crystal device according to claim 13, wherein said ferroelectric liquid crystal has been formed by cooling from a higher temperature phase.

21. A liquid crystal device according to claim 13, wherein said ferroelectric liquid crystal is in a chiral smectic phase.

22. A liquid crystal device according to claim 21, wherein said chiral smectic phase is chiral smectic C phase, H phase, J phase, K phase or G phase.

23. A liquid crystal apparatus according to claim 1, wherein said pair of substrates have uniaxial orientation axes of mutually different orientation controlling powers on their faces contacting the ferroelectric liquid crystal.

24. A liquid crystal apparatus according to claim 23, wherein said uniaxial orientation axes of mutually different orientation controlling powers are provided to different orientation controlling films formed on the substrates.

25. A liquid crystal apparatus according to claim 23, wherein said uniaxial orientation axes of mutually different orientation controlling powers have been provided by different orientation control treatments.

26. A liquid crystal apparatus according to claim 23, wherein one of said uniaxial orientation axes of different orientation controlling powers has an orientation controlling power provided by the combination of an orientation controlling film having a uniaxial orientation axis and an orientation suppressing film formed thereon, and the other uniaxial orientation axis has an orientation controlling power provided by an orientation controlling film having a uniaxial orientation axis.

27. A liquid crystal apparatus according to claim 26, wherein said orientation suppressing film is a coating film of a silane coupling agent.

28. A liquid crystal apparatus according to claim 26, wherein said orientation controlling film is a coating film of a titanium coupling agent.

29. A liquid crystal apparatus according to claim 26, wherein said orientation controlling film is a coating film of a zirconium coupling agent.

30. A liquid crystal apparatus according to claim 26, wherein said orientation controlling film is a coating film of an aluminum coupling agent.

31. A liquid crystal apparatus according to claim 26, wherein said orientation controlling film is a coating film of an indium coupling agent.

32. A liquid crystal apparatus according to claim 23, wherein said ferroelectric liquid crystal is formed in a layer which is thin enough to release the spiral structure of the chiral smectic liquid crystal.

* * * * *

UNITED STATES PATENT AND TRADEMARK OFFICE
CERTIFICATE OF CORRECTION

PATENT NO. : 4,778,259
DATED : October 18, 1988
INVENTOR(S) : HIROYUKI KITAYAMA, ET AL.

Page 1 of 2

It is certified that error appears in the above-identified patent and that said Letters Patent is hereby corrected as shown below:

COLUMN 2

Line 3, "while" should read --unlike--.

COLUMN 6

Line 28, "substrate 101" should read --substrate 101a--.

COLUMN 7

Line 3, "SmA?(smectic" should read --SmA→(smectic--.

COLUMN 8

Line 30, "- h" should read -- -(h)--.

COLUMN 9

Line 31, "may be" should read --way of--.

COLUMN 15

Table 2, "Tilt angle h'" should read --Tilt angle (h)'--.

COLUMN 17

Line 38, "and 45°," should read --and -45°,--.

UNITED STATES PATENT AND TRADEMARK OFFICE
CERTIFICATE OF CORRECTION

PATENT NO. : 4,778,259
DATED : October 18, 1988
INVENTOR(S) : HIROYUKI KITAYAMA, ET AL.

Page 2 of 2

It is certified that error appears in the above-identified patent and that said Letters Patent is hereby corrected as shown below:

COLUMN 21

Line 62, "having" should read --has--.

Signed and Sealed this

Twenty-ninth Day of August, 1989

Attest:

DONALD J. QUIGG

Attesting Officer

Commissioner of Patents and Trademarks